Patented Apr. 30, 1935

1,999,335

UNITED STATES PATENT OFFICE 1,999,335

AGENT FOR THE PURIFICATION OF OILS

Percival John McDermott, Manchester, England, assignor to Refiners Limited, Manchester, England, a British company No Drawing. Application February 13, 1933, Serial No. 656,583

4 Claims. (Cl. 252—1)

This invention relates to the purification of petrol and like oils and spirits by the removal therefrom of sulphurous, resinous and other undesirable impurities and by the polymerization of undesirable unsaturated hydrocarbons in such a way that desirable unsaturated hydrocarbons are not affected and therefore obtaining increased yields.

The invention is a further modification and improvement of reagents and processes heretofore described in prior Patents 1,658,285 and 1,742,343. The discovery has been made that when treating cracked gasolines and especially those crude distillates obtained from vapor phase cracking processes, the best results are obtained when using certain ratios of ingredients in the treating reagent. This reagent consists of what is termed herein an acid ferric sulphate, being a mixture or combination of ferric sulphate and free sulphuric acid, mixed with an absorbent earth such as fuller's earth.

In general, the spirits to be treated are agitated with the reagent at an elevated temperature usually above 45° C., taking proper precautions to avoid vapor losses, then removing the spent reagent by filtration or other suitable means, neutralizing with alkali and steam distilling. The ratio of free sulphuric acid to ferric sulphate in the reagent is maintained at a higher point than was satisfactory for the treatment of benzols and coal tar naphthas and has resulted in quite surprising results when these modified reagents were applied to the cracked distillates of petroleum. The process can be carried out in various ways depending on the type of refined product desired and the crude to be treated.

The invention will be illustrated by the following examples but it is not intended that the scope shall be limited thereby as the proportions, temperatures, etc. may be varied over quite wide limits from those given in the specific examples.

In preparing the various reagents, it is convenient to prepare a base mixture along the following lines: 400 parts by weight of iron oxide, preferably a material such as is obtained as the by-product of aniline manufacture or a calcined spent gas oxide is mixed in a dough mixer with 80 parts of fuller's earth. To the mix is added 630 parts of 82% sulphuric acid and mixing continued until the pasty mass first formed becomes a fairly dry powder which usually contains some lumps. After breaking up these lumps, 210 parts more fuller's earth are added and mixed in. Finally, 210 parts of 82% sulphuric acid and a small amount of nitric acid (5–20 parts) are added and mixing continued for 15–20 minutes. The material is then dried at 110° C. and ground to pass a 60 mesh screen. In the description this reagent will be referred to as base reagent and it must be understood that the proportions and screen size can be materially varied without departing from the spirit and scope of the invention. Variations will depend on the raw materials used; for example, the solubility of the iron oxide, the ratio of ferric and ferrous oxide in the iron oxide, the lime or other alkali in the fuller's earth, etc. This base reagent is substantially that which has been found very suitable for the purification of benzols and coal tar naphthas.

To make one type of reagent used in this work, 360 parts of the base reagent is mixed with 360 parts of fuller's earth and 270 parts of 96% sulphuric acid. This is denoted as reagent I in this specification.

Another type is prepared by mixing 830 parts of the base with 175 parts of the 96% sulphuric acid. This is referred to as reagent II. This further addition of acid sometimes increases the soluble iron with certain types of iron oxides.

When these reagents were analyzed as far as the water soluble constituents are concerned, the following results were obtained:—

|  | Base | Mixture I | Mixture II |
|---|---|---|---|
|  | Percent | Percent | Percent |
| Free sulphuric acid ($H_2SO_4$) | 10.0 | 15.0 | 16.5 |
| Ferrous sulphate ($FeSO_4$) | 1.5 | 1.0 | 2.0 |
| Ferric sulphate ($Fe_2(SO_4)_3$) | 37.0 | 22.0 | 34.0 |

The above analyses were made by boiling a portion of the finished reagent with water, filtering and making the tests on the filtrate. Free acid is determined by titrating in the presence of potassium fluoride. The total iron is obtained by titration with potassium permanganate after treatment with stannous chloride and mercuric chloride. The ferrous iron is obtained by a similar titration without reducing agents, ferric iron being obtained by difference.

In general, the reagents used most successfully for treating petroleum hydrocarbons and especially crude gasoline have a ratio of free sulphuric acid to ferric sulphate in excess of 0.35 and the best results have been obtained when this ratio has been between 0.45 and 0.80 although in some cases satisfactory results have been obtained when the ratio has been above 1.00. When the ratio of acid to ferric sulphate is varied, it is sometimes necessary to vary the proportions of the absorbent earth so as to maintain the characteristics necessary for convenient application of the reagent. The fuller's earth can be replaced by other suitable absorbent materials.

The reagents are regarded for the purpose of defining them in the claims as mixtures of absorbent earth and acid ferric sulphate with varying ratios of free sulphuric acid ($H_2SO_4$) and ferric sulphate ($Fe_2(SO_4)_3$).

In the use of these reagents, taking for example reagent I, a crude distillate from the vapor phase cracking of petroleum was employed. This crude distillate on assay contained about 90% of 437° F. end point gasoline and had been given a wash with strong caustic soda solution. It was distilled and cut at 300° F., treating the distillate and residue separately. The light distillate was treated with 30% of the total reagent used, mixing for 40 minutes at a temperature of 50° C. The residue was mixed with 70% of the total reagent at 60° C. for 45 minutes. Both were then filtered, recombined and steam distilled, the distillate being neutralized with ammonia or caustic soda solution. The total use of reagent corresponded to 6½ pounds per barrel (42 United States gallons) of crude treated.

The product obtained showed that of the 437° end point gasoline present in the original crude, 95.5% were recovered in the refined distillate. The refined distillate cut to 437° end point had a Saybolt colour of 20, a gum by glass dish of 7 milligrams per 100 c. c. and was sweet to the "doctor" test.

An alternate method of treatment is to treat the entire crude with a portion of the reagent, filter, neutralize and distil to cut the light fraction which has been sufficiently purified, then add the balance of the reagent to the residue and treat it at the same or higher temperature than the light fraction, finally filtering, neutralizing and distilling with steam or vacuum to the proper end point and finally mixing this distillate with the light distillate. Either this method or the one first described can be carried out either as a batch or continuous process.

A still further method of treatment may be described as follows:—A similar crude vapor phase cracked distillate after caustic soda washing was mixed with 5 pounds of reagent II (per barrel). The mixing was carried on at 170° F. and continued for 2¼ hours. The product was filtered, neutralized with caustic soda, and distilled to give a product of 435° F. end point. The yield obtained was 93.5% of that originally in the crude, the polymerization loss being only 6.5%.

The product was of very high grade with a color of 27–28 Saybolt, glass dish gum of 2 milligrams per 100 c. c., 49% by volume of aromatics and unsaturates, a bromine number of 96 and a C. F. R. research method octane number of 81. On exposure to light and air, a good degree of color and gum stability was noted. The treatment as above described can be carried out either in batches or continuously.

The process removes the impurities, causing color and gum formation, without destroying the valuable unsaturated hydrocarbons in gasoline. In this way, yields are increased and anti-knock values preserved.

Although the process has been described in connection with vapor phase cracked gasolines which contain a very high proportion of unsaturated hydrocarbons, it can be utilized to advantage on crude distillates of other types of cracking processes or on straight run crudes from topping or similar operations.

What I claim is:

1. A new composition of matter consisting of a solid substantially dry powdered or granular material comprising an adsorbent earth and a mixture of ferric sulphate and free sulphuric acid adsorbed thereon, the ratio of the free sulphuric acid to the ferric sulphate exceeding 0.35 but not exceeding 0.80.

2. A new composition of matter consisting of a solid substantially dry powdered or granular material comprising an adsorbent earth and a mixture of ferric sulphate and free sulphuric acid adsorbed thereon, the ratio of the free sulphuric acid to the ferric sulphate exceeding 0.45 but not exceeding 0.80.

3. A composition of matter as claimed in claim 1 wherein the adsorbent earth is fuller's earth.

4. A new composition of matter consisting of a solid substantially dry powdered or granular material comprising fuller's earth and a mixture of ferric sulphate and free sulphuric acid adsorbed thereon, the ratio of the free sulphuric acid to the ferric sulphate exceeding 0.45 but not exceeding 0.80.

PERCIVAL JOHN McDERMOTT.